(12) United States Patent
vom Hagen et al.

(10) Patent No.: US 8,651,748 B2
(45) Date of Patent: *Feb. 18, 2014

(54) CONNECTING BRIDGE FOR TWO OPTICAL UNITS

(75) Inventors: Christoph Hilmar Graf vom Hagen, Giessen (DE); Sven Roman Mueller, Butzbach (DE); Werner Schmidt, Wettenberg (DE); Alexander Zoellmann, Lich (DE)

(73) Assignee: Schmidt & Bender GmbH & Co. KG, Biebertal (DE)

( * ) Notice: Subject to any disclaimer, the term of this patent is extended or adjusted under 35 U.S.C. 154(b) by 125 days.

This patent is subject to a terminal disclaimer.

(21) Appl. No.: 13/089,573

(22) Filed: Apr. 19, 2011

(65) Prior Publication Data
US 2012/0070119 A1 Mar. 22, 2012

(30) Foreign Application Priority Data

May 3, 2010 (DE) .......................... 10 2010 016 761

(51) Int. Cl.
*G02B 6/36* (2006.01)
(52) U.S. Cl.
USPC ......................................................... 385/53

(58) Field of Classification Search
None
See application file for complete search history.

(56) References Cited

U.S. PATENT DOCUMENTS

| 4,555,747 | A | 11/1985 | Tsuruta |
| 5,229,598 | A | 7/1993 | Filipovich |
| 5,535,053 | A | 7/1996 | Baril et al. |
| 5,703,354 | A | 12/1997 | Wannagot et al. |
| 6,493,137 | B1 | 12/2002 | Solinsky et al. |
| 6,687,053 | B1 | 2/2004 | Holmes et al. |
| 7,365,905 | B2 | 4/2008 | Floyd et al. |
| 2006/0164401 | A1 | 7/2006 | Ishida |
| 2007/0267567 | A1* | 11/2007 | Filipovich et al. ...... 250/214 VT |
| 2008/0007826 | A1 | 1/2008 | Smith et al. |
| 2012/0069431 | A1* | 3/2012 | Hagen et al. .................. 359/399 |

FOREIGN PATENT DOCUMENTS

| EP | 1 783 529 | 5/2007 |
| EP | 2 065 742 | 6/2009 |

* cited by examiner

*Primary Examiner* — Sarah Hahm
(74) *Attorney, Agent, or Firm* — Clark & Brody

(57) ABSTRACT

The invention relates to a connecting bridge to connect two optical units. This connecting bridge is fitted in each case with at least one coupling for each optical unit making possible, besides mechanical coupling, also transmitting electronic signals and/or setting up an electrical connection.

15 Claims, 1 Drawing Sheet

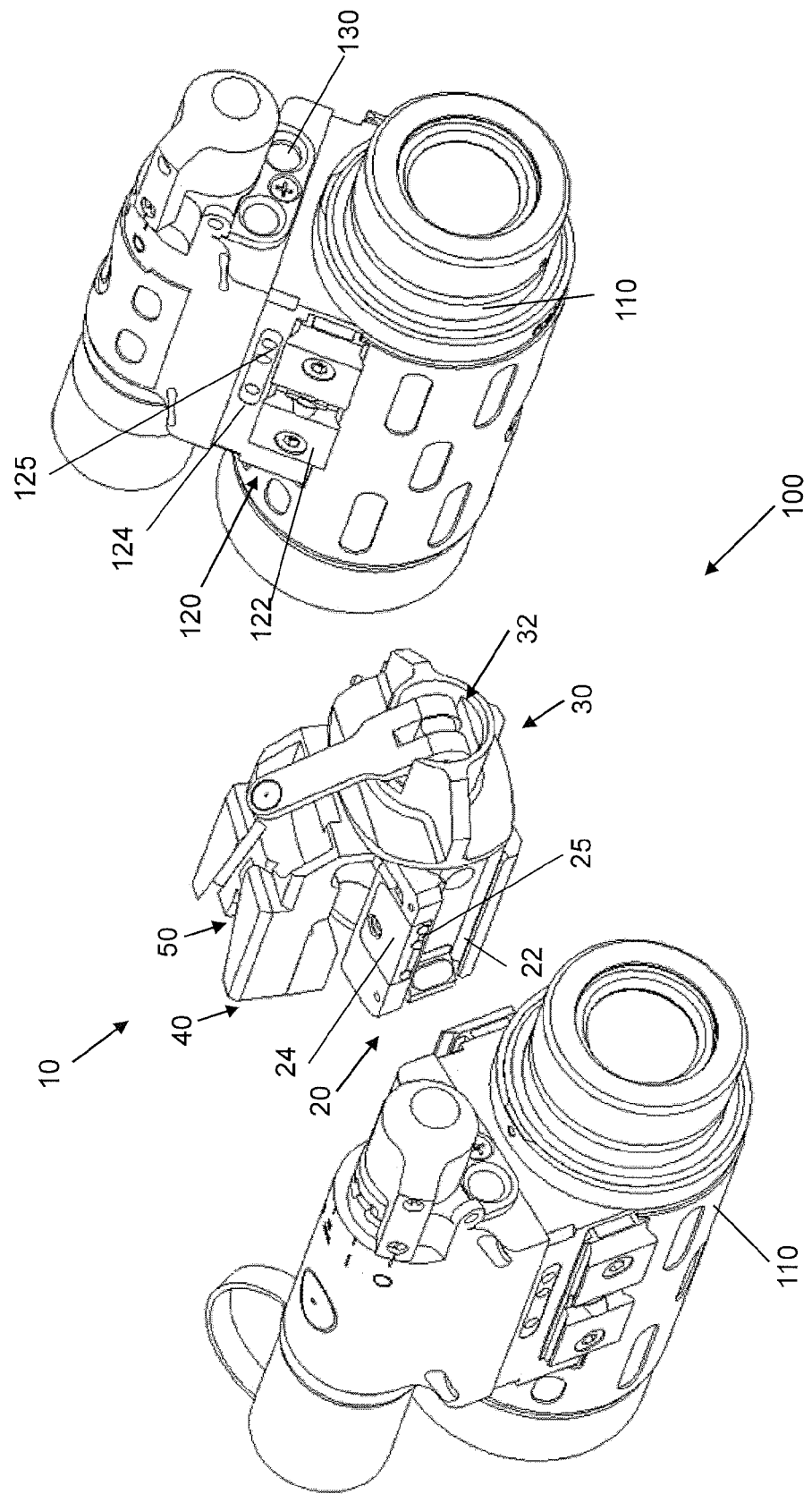

CONNECTING BRIDGE FOR TWO OPTICAL UNITS

The present invention relates to a connecting bridge linking two optical units. For each optical assembly the connecting bridge is fitted with at least one coupling allowing, besides mechanical coupling, also transmitting electronic signals and/or setting up an electrical connection.

Such connecting bridges basically are known for optical units such as magnifier lenses respectively binoculars/telescopes. Conventionally these known connecting bridges are firmly coupled to the particular monocular/telescope and consequently a unit is made up of two monoculars/telescopes and one connecting bridge. The known connecting bridges incur the drawback of lacking operational flexibility. Illustratively, depending on the operational conditions, identical optical units must be used, resp. different optical units cannot be combined. Basically similar bridges also are known and used for night-vision instruments and serve as mechanical connecting means for instance between two optical units or low-light intensifiers. In this instance too the firm coupling between the low-light intensifiers and the connecting bridge entail insufficient operational flexibility.

Accordingly it is the objective of the present invention to remedy the drawbacks of known apparatus. In particular its objective is to create a connecting bridge offering high flexibility under various operational conditions.

This problem is solved by a connecting bridge having the features of the independent claim 1 and by means of an optical assembly defined by the features of the independent claim 12. The claims following the said independent claims define advantageous embodiment modes of the present invention.

The connecting bridge of the present invention is designed to couple two optical units. This design is based on the fact that it shall be used mainly on humans. Accordingly a restriction to two optical units, i.e. as one optical unit per eye, is adequate.

Therefore the connecting bridge of the present invention comprises at least one coupling for each optical unit to couple the particular optical unit to said connecting bridge. The coupling therefore is used to reversibly couple the particular optical unit to the connecting bridge. This feature offers a flexible optical assembly in which the range of functions of said bridge of the invention allows flexibly combining different optical units with one another. Therefore, besides combining identical night vision units, a particular unit also may be matched to a user's eyesight. Moreover optical units may be combined that are based on different physical methods. Illustratively a low-light intensifier might be combined with an infrared camera, whereby the viewer would see the same image frame of the scene in each eye though with different characteristics resp. processing stages. As a result, the information content of an optical assembly may be flexibly matched to the operational conditions by using a connecting bridge of the present invention.

The coupling unit comprises both mechanical and electronic coupling elements which are configured in a way that the electronic ones set up an electronic contact between the connecting bridge and the particular optical unit when the mechanical ones set up mechanical contact between said optical unit and said connecting bridge.

In other words, the mechanical coupling automatically entails the electronic one. This feature offers the advantage that the user need not set up the electronic coupling separately, instead he attains the desired operational readiness already by actuating the mechanical coupling. Such a feature already may be attained by the geometry and configuration of the coupling elements relative to each other. The coupling is reversible both mechanically and electronically. As a result, optical units may be coupled to and released from the connecting bridge as often as desired.

The expression "electronic coupling" herein denotes intelligent coupling. Illustratively it may to include the feasibility to exchange electronic signals by means of the electronic coupling elements. Again, alternatively or in addition to the electronic coupling elements, electric connection may be implemented by means of which electric power may be transmitted, namely an electric circuit shall be formed.

Different embodiment modes may be considered regarding the mechanical coupling elements. Illustratively mechanical coupling may be implemented in geometrically interlocking manner. Other mechanisms, for instance clamping or magnetic coupling, are feasible too.

A connecting bridge of the invention comprises a connector running at least segment-wise between the coupling elements of the particular optical unit and mechanically connecting it. Illustratively such a mechanical connection may be implemented using a framework or a dimensionally stable housing. The expression "mechanical connection" means herein that the coupling elements and the connectors are connected frictionally.

To analyze the signals exchanged by the electronic coupling, one embodiment mode of the invention comprises advantageously an analyzer which is electronically connected to the electronic coupling elements and exchanging said electronic signals and/or setting up an electronic connection between the electronic coupling elements of said electronic couplings.

Signal analysis illustratively may be in the form of preparing and interpreting signals. In this manner voltage signals may be received from the optical units' batteries and be analyzed with respect to the instantaneous charge of the particular battery. In said embodiment mode, the analyzer is able to ascertain the particular battery charge of the optical units and even to rate them. Where furthermore the analyzer is designed to set up an electrical connection between the electronic coupling elements of said couplings, then, when the battery charge of the first optical unit is rated as being critical, an electric connection to the second optical unit's battery can be set up by means of the electronic coupling elements. Both optical units are then powered by a single battery. The functional range of the entire optical assembly then shall be retained in full for a longer time.

However the analyzer may also analyze the signals more widely. For instance the instantaneous optical situation, that is, when using night vision instruments, the residual light intensity may be received in the form a signal by the optical units, and, depending on said residual light intensity, another intensifier mode may be selected or an infrared lamp may be turned on. Said analyzer and electronic coupling elements enable a connecting bridge of the invention and make it more intelligent, to supporting the user when he is using the optical units.

To further enhance the flexibility of the connecting bridge of the invention, the connector advantageously may be connected by at least one rotary joint or the like with at least one of the couplings in a manner that said coupling is able to rotate at least partly about the axis of rotation of the rotary joint relative to the connector. In this manner the position of the particular coupling and hence of the particular coupled optical unit may be flexibly adjusted relative to said connector.

As a result, the spacing between the two optical units may be varied within limits. This feature applies when compensating for different interpupillary distances of different users.

Also, depending on the degree of rotation, such a design allows completely swiveling away the particular optical unit. This feature is significant for optical units in the form of low-light (night) vision units when, within the same application, rapid changes between different levels of brightness are taking place.

If the user moves from of a dark zone, wherein he had to operate the optical units, namely the night vision instruments, into a bright zone, for instance a lit room of a house, then, thanks to said feasibility of rotation, said instrument may be quickly swiveled out of his field of view. Accordingly a rapid change is possible between a field of view with optical unit and without one.

Additionally or alternatively to a connection by means of a rotary joint, it may be advantageous in a connecting bridge of the present invention that a connector be linked to at least one of the coupling elements by a translating element in a manner that the spacing of said coupling element to the connector be variable. Translation adjustment is especially significant when relatively large distance differentials are desired. Accordingly a translation element is especially appropriate when adapting to different user interpupillary distances.

In special embodiment modes, the translation elements may be integral with the rotary joint, making possible thereby a mixed displacement of the particular coupling, hence also of the particular coupled optical unit, i.e. a mixture of rotation and translation. Even more complex displacements of the particular coupling and hence of the particular optical unit, will be feasible.

Illustratively the translation elements may be in the form of linear guides. Then a carriage connected to the coupling may be displaced on a rail linked to the connector. Such a rail may run both along a straight line and along a curved one. Alternatively a lever kinematics allowing translation of the particular coupling relative to the connector may also be provided. Such a lever kinematics illustratively may consist of a plurality of rotationally supported levers.

Advantageously, in a further embodiment mode of the present invention, the electronic coupling element and the mechanical coupling element of at least one coupling are at least partly mutually integrated. This design offers the advantage that the integral nature of the two functional elements of the electronic and mechanical coupling elements reduces their total weight.

The total weight of the connecting bridge may be reduced in this manner, hence also the total weight of an optical assembly designed in this manner. In particular as regards optical assemblies directly affixed to a user borne helmet, such a weight reduction increases user comfort. Said integral design further offers the advantage of the especially simple design of the pertinent coupling of the electronic coupling elements. As a result segments and/or surfaces used for mechanical coupling may serve simultaneously, so to speak in dual operation, for electronic coupling.

An embodiment mode especially suited for given applications of the mechanical coupling elements of a connecting bridge of the invention is that of a guide at least partially in dovetail form. Such a dovetail guide is fitted with tapering undercuts and cooperates mechanically with a matching dovetail bar. Such mechanical cooperation can be implemented by frictional locking or also by geometrical interlocking.

It must be borne in mind that said dovetail guide also is provided at the particular optical unit and the corresponding dovetail bar is provided at the particular coupling. An especial advantage of using the dovetail guide and a corresponding dovetail bar is that mechanically coupling will be especially simple. For instance the dovetail bar can be inserted into the corresponding dovetail guide, thereby implementing the mechanical coupling, hence a means for force transmission. Such mechanical coupling allows only one degree of freedom regarding relative displacement between the optical unit and the mechanical coupling element. Said mechanical coupling element may be fitted in the direction of insertion with a mechanical stop, as a result of which the optical unit when being inserted into the mechanical coupling element shall make contact. Thereby an end position is defined, resp. an operational position of the optical unit. In the event of high mechanical stresses, the last degree of displacement freedom can be eliminated by securing the optical unit against being displaced out of the mechanical coupling element, hence the said optical unit being locked in the mechanical coupling element.

Such a stop is advantageous not only for dovetail guide embodiment modes, but also is basically advantageous for a connecting bridge of the present invention. Fasteners may be used to affix the mechanical coupling elements of at least one coupling when latter is coupled to the particular optical unit. Said fasteners are reversible and match the geometry of said mechanical coupling elements. Depending on the kind of mechanical coupling elements, the required number of degrees of freedom both predetermined by the coupling elements and remaining following coupling are secured and thereby the optical unit is supported in statically defined manner in the mechanical coupling element. Illustratively a stop plate may to be used which, depending on the rotary position of the optical unit relative to the mechanical coupling elements assures the last degree of freedom. Advantageously too the said fasteners may be configured centrally for all mechanical coupling elements of all couplings. This feature offers improved operation besides weight reduction, only a single stopping step, hence a single affixation step, needs being carried out. Accordingly the rapidity of adaptation of the flexible application of the connecting bridge of the invention is enhanced further.

The electronic coupling elements of a connecting bridge of the invention may be constituted at least in part by contact surfaces that may engage the matching contact surfaces of the particular optical unit. In the simplest cases, the particular matching contact surfaces of the particular electronic coupling element and the particular optical unit make contact with each other. In other words, the said contact surfaces come to rest against one another, enabling thereby electronic contact in order to exchange signals or to set up electrical connection. The contact surfaces and basically all areas in contact of the electronic coupling elements are made of an electrically conducting material.

Advantageously, as regards embodiment modes in which the electrical coupling elements are fitted with several contact surfaces resp. several contact segments, the configuration of said contact segments or surfaces shall be asymmetrical, i.e. polarized. This polarized design offers the advantage of precluding improper connection, that is improperly connecting the electronic coupling elements. This feature is especially appropriate in applications requiring an electric circuit, that is an electric connection, in order to avert electric shorts.

An alternative embodiment includes electronic coupling elements in the form of pin and socket connections. Illustratively such plug/pin and socket connections are fitted with detent locks allowing reversible engagement of the electronic coupling. This design substantially precludes accidentally disengaging the electronic coupling. Securing the electronic coupling is advantageous especially in applications incurring high mechanical loads/stresses on the connecting bridge of the present invention and on the coupling. Accidentally uncoupling the optical units, in the worst case entailing switching off the particular optical unit and in the case of a night-vision instrument causing darkening the field of view, is averted by such a feature.

The analyzer of one embodiment mode of the present invention advantageously may analyze signals received from the electronic coupling elements with respect to at least one of the following parameters:

Battery status of the optical units,
Operational status of the optical units,
Ambient parameters of the optical operational situation,
Residual/low light-level intensity.

The listing above is not limitative but instead merely shows various ways in which the connecting bridge of the present invention can be used on further applications and hence with higher user comfort. When analysis of the battery status is included, the instantaneous charge of the particular battery of each optical unit is read out, that is detected and analyzed by exchanging signals by means of the electronic coupling elements. Illustratively such analysis applies to the remaining time of use of the particular optical unit. In the case of different remaining times of use of the two optical units, the analyzer then may implement a commensurate compensation. As a result, the analyzer generates, by means of the electronic coupling elements, an electrical connection to the particular optical unit and hence to the particular battery. The battery with the larger charge then supports the battery of the lower charge, whereby the residual time of use of the former is reduced and that of the latter is lengthened. The total time of use of the optical assembly is then lengthened, since otherwise, when operating with only one optical unit, user comfort would be substantially lowered.

Illustratively, when analyzing the ambient parameters, for instance measuring the ambient brightness, the particular amplifying mode and the particular amplification may be matched to the optical units in the form of night vision instruments. As the brightness increases, the analyzer then may lower the degree of amplification, whereas an infrared lamp may be turned on if the brightness drops, especially as the low light intensity becomes inadequate. Said infrared light may be fitted onto one optical unit or even on both and be integral with them.

Besides using only an analyzer, a regulator also may be used to advantage, being electronically connected to the analyzer for signal exchange and regulating at least one of the optical units as a function of the analyzer's signals. Such regulation may be carried out for instance in the manner described in the paragraph immediately above.

Depending on the embodiment mode of the connecting bridge of the invention, it may be advantageous to design the mechanical coupling elements of at least one coupling so that the position of the particular optical unit relative to said connecting bridge is adjustable axially along the optic axis of the particular optical unit. The optic axis of said unit is defined by the line of sight, that is the main sighting axis of the particular optical unit. In other words, a user's interpupillary distance can be varied. This variation illustratively can be implemented by changing the position of a mechanical stop in a guide of the mechanical coupling element.

Another objective of the present invention is an optical assembly comprising a connecting bridge of the present invention and two optical units. Said optical units also are fitted with one coupling each comprising mechanical and electronic coupling elements designed to mechanically and electronically link up with the connecting bridge's coupling.

In other words, the mechanical and electronic coupling elements of the particular coupling of the optical units and of the connecting bridge are complementary resp. corresponding. In this manner an optical assembly is attained offering all the advantages already elucidated below with respect to the individual embodiment modes of the connecting bridge of the invention.

Such an optical assembly of the present invention of such a design comprises optical units in particular in the form of night-vision instruments. These night-vision instruments illustratively are in the form of low light intensifiers. Said night-vision instruments being complex and in particular comprising a battery-based electric power source, the advantages of the present invention are especially impressive. The weight-reducing design and increased service life increase the convenience of such optical assemblies.

When using optical units in the form of night-vision instruments, it may be of further advantage to fit one of these instruments with a switch equipped ON/OFF light source. Such a light source is designed to provide a sufficiently bright image in an otherwise excessively dark ambience. To shield the user of an optical assembly of the invention against being detected, said light source preferably is designed in a range of wavelengths invisible to the human eye. An infrared light is applicable. In an especially simple design, such an infrared light might be in the form of LED(s). Aside the especially low weight of an LED, its low current drain also is advantageous because only slightly loading the power supply, that is the battery of the night-vision instrument.

Even more powerful infrared lamps may be used in an optical assembly of the invention because the higher current drain of such more powerful lamps can be supplied by means of the analyzer and the electronic coupling elements from both batteries of the night-vision instruments. To-date, only an optical assembly of the invention allows operating a high-current infrared lamp at an acceptable service life.

Advantageously the electric coupling elements of the optical units of an optical assembly of the invention shall be asymmetrical/polarized. This feature precludes wrongly connecting the electronic coupling elements when mechanically coupling the optical units to the connecting bridge. In this manner an electric short in particular is precluded.

The appended drawing elucidates the present invention. The concepts of "left", "right", "top", "bottom" used in the description of said FIGURE relate to an orientation displaying typically legible reference numerals.

FIG. 1 shows an embodiment mode of an optical assembly of the invention fitted with an optical connecting bridge also of this invention.

FIG. 1 shows an embodiment mode of the present invention, in particular an optical assembly 100 which, in the unassembled, namely uncoupled state, comprises a connecting bridge 10 of the invention and two optical units 110 in the form of night-vision instruments. Said night-vision instruments are low-light intensifiers. The functions of the connecting bridge 10 per se, as well as in relation to the optical units 110, will be discussed below.

The connecting bridge 10 is shown in its uncoupled state in FIG. 1. Said bridge is fitted at both sides with a coupling 20 of which one is indicated in FIG. 1. Each of said couplings 20 comprises mechanical coupling elements 22 and the electronic coupling elements 24 that couple with the optical units 110. The mechanical coupling elements 22 are designed as a dovetail guide.

The two optical units 110 each also comprise two couplings 120, FIG. 1 showing one coupling 120 per optical unit 110. Thanks to having two couplings 120 per optical unit 110, it is feasible to universally link each optical unit 110 to the left resp. right side of the connecting bridge 10.

Each coupling 120 of the two optical units 110 also comprises mechanical coupling elements 122 and electronic coupling elements 124. The coupling elements 122 and 124 of the couplings 120 are matched to the coupling elements 22 and 24 of the connecting bridge 10. Thus the mechanical coupling elements 122 of the optical units 110 are always designed as dovetail bars. This dovetail bar can be inserted into the dovetail guide of the mechanical coupling elements 22 of the connecting bridge 10. That displacement takes place along the optic axis of the particular optical unit 110. The position of the optical unit 110 relative to said optic axis can be adjusted using an omitted mechanical stop in the mechanical coupling element 22 of the connecting bridge 10.

The dovetail guide cooperates with the dovetail bar in geometrically interlocking manner between the coupling 20 of the connecting bridge 10 and the coupling 120 of the optical unit 110. This geometrical interlock also acts as a frictional lock. In other words, the optical unit 110 is supported in this way in the mechanical coupling element 20 of the connecting bridge 10.

In order to further improve the support/bearing of the optical unit 110, the embodiment mode of FIG. 1 comprises a fastener 32 at the connector 30 of the connecting bridge 10. The position of this fastener 32 is shown closed in FIG. 1.

The clamping lever of the fastener 32 is tightened to insert the optical units 110, i.e. to couple them to the connecting bridge 10, i.e. it is displaced forward to the right in FIG. 1. Thereupon the stop plate of the fastener can be rotated by 90° and as a result makes the mechanical coupling elements 22 of the connecting bridge 10 accessible. The dovetail bars of the optical units 110 can be moved in place to implement mechanical coupling. Next the stop plate is again rotated by 90°, locking in place thereby the mechanical coupling elements 22 of the connecting bridge 10 resp. the mechanical coupling elements 122 of the optical unit 110 when in the mechanically coupled state. The optical unit 110 is supported in statically defined manner in said state.

Electronic coupling elements 24 resp. 124 are used besides the mechanical the mechanical coupling elements 22 resp. 122 in the optical connectors 110 and of the connecting bridges 10. These electronic coupling elements 24 and 124 are three flat contact spots 125 at both components, that is at the optical units 110 and at the connecting bridge 10. These three contact spots 125 are arrayed asymmetrically, i.e. are polarized, to preclude erroneous electronic contacting.

The electronic coupling elements 24 and 124 are configured to automatically contact each other as soon as the mechanical coupling elements 22 and 122 are coupled to one another. The relative position between the optical units 110 and the connecting bridge 10 and hence between the electronic coupling elements 24 and 124 is assured on one hand by the dovetail guide and on the other hand by the combination of a mechanical stop and the fastener 32. As a result there is a single, defined position of the electronic coupling elements 124 of the optical units in their mechanically coupled state relative to the electronic coupling elements 24 of the connecting bridge 10. In this way, by means of an accurately determined position based on the mechanical coupling elements 22 ands 122, electronic coupling also may be implemented automatically.

The analyzer 40 and the regulator 50 configured within the connector 30 of the connecting bridge 10 are not shown in further detail. In this embodiment, said analyzer and regulator are in the form of a central computer part and, in their coupled state, communicate by means of the electronic coupling elements 24 of the connecting bridge 10 with the electronic coupling element 124 of the particular optical unit 110. Besides implementing a pure exchange of signals, an electrical connection between the two optical units 110 also may be set up, making it possible to sustain such an exchange respectively to mutually boost the optical units in case of a weak battery.

The connector 30 is designed as a dimensionally stable casing which, besides mechanically connecting the two couplings 20 also receives the analyzer 40 and the regulator 50.

Moreover the said connector 30 comprises a purely mechanical interface configured at its top side. This strictly mechanical interface allows mounting the connecting bridge 10 to a support such as a helmet or a head rest. In this way the user of such an optical assembly 100 is able to latter to operate it without having to keep it manually in front of his eyes. Said mechanical interface also is designed to be reversible, allowing affixation and detachment of the connecting bridge 10. It is immaterial in this respect whether at the time of affixation, the optical units 110 already are coupled or not to the connecting bridge 10.

Each optical unit 110 is fitted with a battery drawer configured at the top of each said optical units and fitted with a lid on its rear side. Each optical unit 110 comprises an additional light source 130 which to is an infrared LED in the embodiment mode of FIG. 1. In the case of poor light, said additional light source is turned ON to provide low-light amplification for the optical units 110. Said additional light source is also powered by the battery feeding the particular optical unit 110.

LIST OF REFERENCE NUMERALS

10 connecting bridge
20 coupling
22 mechanical coupling element
24 electronic coupling element
25 contact surfaces
30 connector
32 fastener
40 analyzer
50 regulator
100 optical assembly
110 optical unit
120 coupling
122 mechanical coupling element
124 electronic coupling element
125 contact surfaces
130 light source.

The invention claimed is:

1. A connecting bridge (10) to connect two optical units (110), each comprising a battery, comprising:
   at least one coupling (20) for coupling each optical unit (110) to the connecting bridge (10), said connecting bridge being fitted with both mechanical coupling elements (22) and electronic coupling elements (24) that are configured in a manner that the electronic coupling elements (24) set up electronic contact between the connecting bridge (10) and the optical units (110) coupled thereto when the mechanical coupling elements (22) set up mechanical contact between the coupled optical units (110) and the connecting bridge (10),
   a connector (30) extending at least in segments between each of the couplings (20) and mechanically linking the couplings to each other, and
   an analyzer (40) which is part of the connecting bridge (10) and can be electronically connected to the electronic coupling elements (24) of the optical units (110) and can exchange electronic signals with the electronic coupling elements (24) and/or can set up an electric connection between the electronic coupling elements (24) of the couplings (20), the analyzer (40) analyzes signals received from the electronic coupling elements (24) regarding a battery status of the optical units (110) and generates an electric connection to the batteries of both optical units 110 via the electronic coupling elements (24) to support the battery having a lower charge by the battery having a larger charge.

2. The connecting bridge (10) as claimed in claim 1, characterized in that the connector (30) is connected by at least one rotary joint to at least one of the couplings (20) in a manner that the coupling so connected can rotate at least partly about the axis of rotation of the at least one rotary joint relative to the connector (30).

3. The connecting bridge (10) as claimed in claim 1, characterized in that the connecting bridge (30) is connected using one translational element to at least one of the couplings (20) in a manner that the spacing of the coupling (20) so connected to the connector (30) is variable.

4. The connecting bridge (10) as claimed in claim 1, characterized in that the electric coupling element (24) and the mechanical coupling element (22) of at least one of the couplings (20) are at least partly integral with one another.

5. The connecting bridge (10) as claimed in claim 1, characterized in that the mechanical coupling element (22) of at least one of the couplings (20) is designed to be at least partly a dovetail guide.

6. The connecting bridge (10) as claimed by claim 1, characterized by fasteners (32) affixing the mechanical coupling element (22) of at least one of the couplings (20) when the at least one coupling is linked to one of the optical units (110).

7. The connecting bridge (10) as claimed in claim 1, characterized in that the electronic coupling element (24) of at least one of the couplings (20) are constituted in part by contact surfaces (25) able to make contact a matching contact surface (125) of the coupled optical unit (110).

8. The connecting bridge (10) as claimed in claim 1, characterized in that the electronic coupling element (24) of at least one of the couplings (20) are pin and socket connections.

9. The connecting bridge (10) as claimed in claim 1, characterized in that the analyzer (40) analyzes the electronic signals received from the electronic coupling elements (24) with respect to at least one of the following parameters:
operability status of the optical units,
ambient parameters of the optical operational situation, and
low light-level intensity.

10. The connecting bridge (10) as claimed in claim 1, further comprising a regulator (50) connected to the analyzer (40) for the purpose of exchanging signals with the analyzer and regulating at least one of the optical units (110) as a function of the electronic signals from the analyzer (40).

11. The connecting bridge (10) as claimed in claim 1, characterized in that the mechanical coupling elements (22) of at least one of the couplings (20) allow adjusting a position of the coupled optical unit (110) relative to the connecting bridge (10) in the axial direction along the optic axis of the coupled optical unit (110).

12. An optical assembly (100) fitted with a connecting bridge (10) according to claim 1 and two optical units (110), wherein each optical unit (120) comprises a coupling (120) with a mechanical coupling element (122) and an electronic coupling element (124) that are designed to mechanically and electronically link up with one of the couplings (20) of the connecting bridge (10).

13. The optical assembly (100) as claimed in claim 12, that the optical units (110) are night-vision instruments.

14. The optical assembly (100) as claimed in claim 13, characterized in that at least one of the night vision instruments is fitted with a switch-equipped light source (130).

15. The optical assembly (100) as claimed in claim 12, characterized in that the electronic coupling elements (124) of the optical units (110) are asymmetrical.

\* \* \* \* \*